(12) United States Patent
Yun

(10) Patent No.: US 12,469,215 B2
(45) Date of Patent: Nov. 11, 2025

(54) METHOD AND APPARATUS FOR REAL-TIME IMAGE-BASED LIGHTING OF 3D SURROUND VIEW

(71) Applicant: HYUNDAI MOBIS CO., LTD., Seoul (KR)

(72) Inventor: Yeo Min Yun, Suwon-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 210 days.

(21) Appl. No.: 18/350,869

(22) Filed: Jul. 12, 2023

(65) Prior Publication Data

US 2024/0078747 A1    Mar. 7, 2024

(30) Foreign Application Priority Data

Sep. 7, 2022    (KR) .......................... 10-2022-0113157

(51) Int. Cl.
*G06T 17/00*    (2006.01)
*G06T 5/40*    (2006.01)
(Continued)

(52) U.S. Cl.
CPC .............. *G06T 17/00* (2013.01); *G06T 5/40* (2013.01); *G06T 5/70* (2024.01); *G06V 10/25* (2022.01);
(Continued)

(58) Field of Classification Search
CPC . G06T 17/00; G06T 2207/20132; G06T 5/70; G06T 5/40; G06T 2207/30252;
(Continued)

(56) References Cited

U.S. PATENT DOCUMENTS

2016/0137126 A1* 5/2016 Fürsich ................... B60R 1/26
                                                                 348/148
2019/0355171 A1* 11/2019 Ashley ................... G06T 15/04
(Continued)

OTHER PUBLICATIONS

Extended European Search Report (EESR) dated Feb. 6, 2024 issued in corresponding European Patent Application No. 23188960.1.

(Continued)

*Primary Examiner* — Phi Hoang
(74) *Attorney, Agent, or Firm* — NovoTechIP International PLLC

(57) ABSTRACT

An image-based lighting method includes: receiving an input image obtained by capturing a scene of one of a front, rear and side of a vehicle; generating a panoramic image by mapping a first coordinate of each pixel constituting a region of interest of the received input image to a corresponding second coordinate using a lookup table; analyzing histograms of red, green, and blue of an upper region of the panoramic image to select a color in which a red value, a green value, and a blue value with a highest frequency are combined, and performing alpha blending on the upper region using the selected color; adjusting saturation of the panoramic image; and converting the panoramic image into a cube map image and applying the cube map image to a 3D vehicle model, wherein the lookup table stores a relationship in which a first coordinate of each of the pixels constituting the region of interest of the input image corresponds to a second coordinate of a pixel of the panoramic image.

10 Claims, 4 Drawing Sheets

(51) Int. Cl.
  *G06T 5/70* (2024.01)
  *G06V 10/25* (2022.01)
  *G06V 10/56* (2022.01)
(52) U.S. Cl.
  CPC .... *G06V 10/56* (2022.01); *G06T 2207/20132* (2013.01); *G06T 2207/30252* (2013.01)
(58) Field of Classification Search
  CPC ... G06T 15/503; G06T 15/04; G06T 2215/12; G06T 15/06; G06T 15/506; G06T 15/005; G06T 15/50; G06T 7/90; G06T 3/18; G06V 10/25; G06V 10/56; H04N 13/15; H04N 13/243
  See application file for complete search history.

(56) References Cited

U.S. PATENT DOCUMENTS

| | | | | |
|---|---|---|---|---|
| 2020/0252633 | A1* | 8/2020 | Oikawa | H04N 19/167 |
| 2020/0264695 | A1* | 8/2020 | Sanjoto | G06F 3/00 |
| 2021/0064910 | A1* | 3/2021 | Meier | G06V 40/171 |
| 2021/0090338 | A1* | 3/2021 | Chen | G06F 3/0304 |
| 2021/0309149 | A1* | 10/2021 | Inagaki | G06T 11/203 |
| 2021/0329285 | A1* | 10/2021 | Yonezawa | H04N 19/23 |
| 2022/0109777 | A1* | 4/2022 | Sakai | H04N 1/00013 |
| 2022/0245953 | A1* | 8/2022 | Higgins-Luthman | H04N 7/18 |
| 2022/0405514 | A1* | 12/2022 | Guzik | G06V 10/25 |
| 2023/0016304 | A1* | 1/2023 | Choi | G06V 20/58 |
| 2023/0298234 | A1* | 9/2023 | Sakhi | G06T 11/001 |
| | | | | 345/619 |

OTHER PUBLICATIONS

Anonymous, Chapter 10, Real-Time Computation of Dynamic Irradiance Environment Maps NVIDIA Developer (Apr. 4, 2020).
Seo Woo Han et al, PIINET A 360-degree Panoramic Image Inpainting Network Using a Cube Map, arxiv.org, Cornell University Library, 201 Olin Library Cornell University Ithac.
Unknown, 360° Wrap-Around Video Imaging Technology Ready for Integration with Fujitsu Graphics SoCs, (Jan. 1, 2014).

* cited by examiner

METHOD AND APPARATUS FOR REAL-TIME IMAGE-BASED LIGHTING OF 3D SURROUND VIEW

CROSS-REFERENCE TO RELATED APPLICATIONS

This application is based on, and claims priority from, Korean Patent Application Number 10-2022-0113157, filed Sep. 7, 2022, the disclosure of which is incorporated by reference herein in its entirety.

TECHNICAL FIELD

The present disclosure relates to a real-time image-based lighting method and apparatus for a 3D surround view. More specifically, the present disclosure relates to a real-time image-based lighting method and apparatus for a 3D surround view that reflects a real image around a vehicle using a lookup table to a 3D vehicle model.

BACKGROUND

The contents described below merely provide background information related to the present embodiment and do not constitute prior art.

For the safety and convenience of a driver and a pedestrian, the development and commercialization of a 3-Dimensional Surround View Monitor (hereinafter "3D SVM") technology is actively progressing. The 3D SVM provides a 3D surround view image in the form of a bird's eye view around a vehicle using four cameras installed on the front, rear, left, and right sides of the vehicle. Through this, a driver can check the surroundings in real time and make a situation judgment when parking and driving the vehicle.

The 3D SVM provides a realistic 3D surround view by outputting not only the surroundings of the vehicle but also the 3D vehicle model. To differentiate the quality of the 3D SVM, texture mapping is applied to express light reflection, gloss, and material on the surface of the 3D vehicle model. Specifically, in the related art, environment mapping or reflection mapping is applied to the 3D vehicle model using a fixed panoramic image. Here, reflection mapping is an image-based lighting technology that uses a pre-calculated texture to approximate the appearance of a reflective surface, and includes sphere mapping, cube mapping, and the like.

However, the related art has the following problems.

First, only a pre-produced panoramic image is applied due to performance limitations, and only a fixed image that does not actually reflect the surroundings of the vehicle is reflected on the 3D vehicle model, giving the user a sense of heterogeneity different from the real environment.

Second, the camera mounted on the vehicle cannot obtain a panoramic image of the surroundings of the vehicle in real time. Even when there is a technology for generating panoramic images from a plurality of images (SfM (Structure from Motion), Stereo Vision, or the like) or a technology for converting one normal image into a panoramic image ("Omni-Directional Image Generation from Single Snapshot Image, 2020 IEEE"), it is difficult for vehicle MCU (Micro Controller Unit) or VPU (Vision Processing Unit) to process in real time.

Therefore, in order to perform reflection mapping on images around a vehicle captured in real-time in the 3D SVM for a vehicle to a 3D vehicle model, a method capable of real-time processing without much difference from the existing quality using limited resources is required.

SUMMARY

According to one embodiment of the present disclosure, a panoramic image may be generated in real time from a single image.

According to one embodiment of the present disclosure, an image obtained by capturing around a vehicle may be reflected on a 3D vehicle model in real time by using a lookup table.

The problems to be solved by the present disclosure are not limited to the problems mentioned above, and other problems not mentioned will be clearly understood by those skilled in the art from the description below.

According to one aspect of the present disclosure, an image-based lighting method for a 3D surround view is disclosed. An input image is obtained from a camera which captures a scene of one of a front, rear and side of a vehicle. A panoramic image is generated from the input image by mapping a first coordinate of each pixel constituting a region of interest of the input image to a corresponding second coordinate using a lookup table, wherein the lookup table stores a relationship in which a first coordinate of each pixel constituting the region of interest of the input image corresponds to a second coordinate of a pixel of the panoramic image. Alpha blending is performed on an upper region of the panoramic image using a selected color, wherein the selected color is determined by combining a red value, a green value, and a blue value with a highest frequency from histograms of red, green, and blue of the upper region of the panoramic image. A saturation of the panoramic image is adjusted. The panoramic image is converted into a cube map image, and the cube map image is applied to a 3D vehicle model.

According to another aspect of the present disclosure, an image-based lighting apparatus includes a camera disposed to capture a scene of one of a front, rear and side of a vehicle; an image receiving unit configured to receive an input image captured by the camera; a lookup table configured to store a relationship in which a first coordinate of each pixel constituting a region of interest of the input image corresponds to a second coordinate of a pixel of a panoramic image; an image generation unit configured to generate the panoramic image by mapping the first coordinate of each pixel constituting the region of interest of the received input image to the corresponding second coordinate using the lookup table; an image correction unit to configured to analyze histograms of red, green, and blue of an upper region of the panoramic image to select a color in which a red value, a green value, and a blue value with the highest frequency are combined, and perform alpha blending on the upper region using the selected color; a post-processing unit configured to adjust saturation of the panoramic image; and a cube mapping unit configured to convert the panoramic image into a cube map image and apply the cube map image to a 3D vehicle model.

According to one embodiment of the present disclosure, a real image captured around a vehicle may be reflected on the surface of a 3D vehicle model in real time to express a 3D surround view with improved realism.

According to one embodiment of the present disclosure, a more sophisticated 3D surround view representation may be enabled and quality of a 3-Dimensional Surround View Monitor (3D SVM) may be improved by reducing an amount of real-time computation using a lookup table.

DETAILED DESCRIPTION

Figure 1:
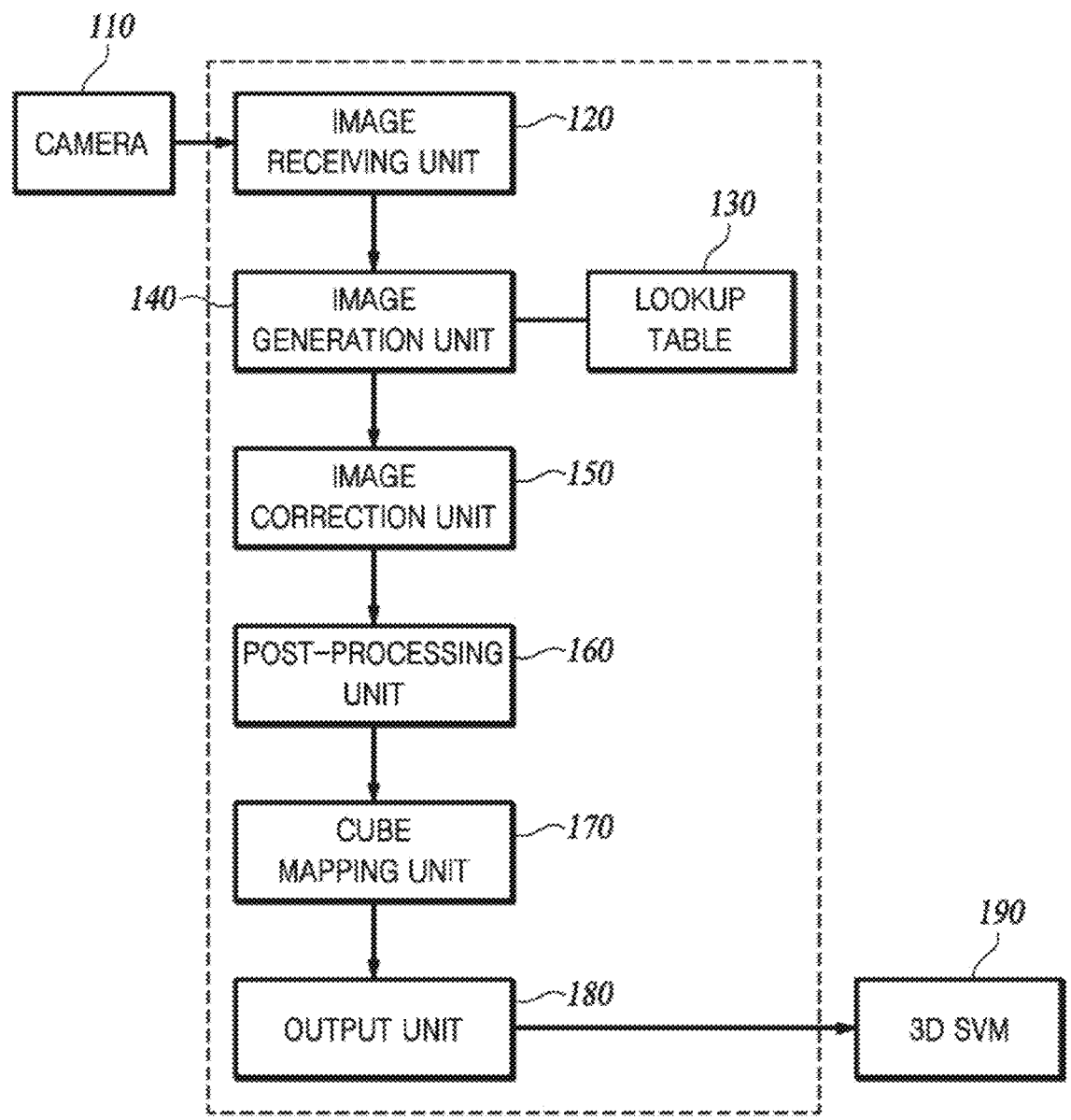
FIG. 1 is a block diagram of an image-based lighting apparatus according to one embodiment of the present disclosure.

Hereinafter, some embodiments of the present disclosure will be described in detail with reference to the accompanying drawings. In the following description, like reference numerals preferably designate like elements, although the elements are shown in different drawings. Further, in the following description of some embodiments, a detailed description of related known components and functions when considered to obscure the subject of the present disclosure will be omitted for the purpose of clarity and for brevity.

In describing the components of the embodiments, alphanumeric codes may be used such as first, second, i), ii), a), b), etc., solely for the purpose of differentiating one component from others but not to imply or suggest the substances, the order, or sequence of the components. Throughout this specification, when parts "include" or "comprise" a component, they are meant to further include other components, not to exclude thereof unless there is a particular description contrary thereto.

The detailed description set forth below in conjunction with the appended drawings is intended to describe exemplary embodiments of the present disclosure and is not intended to represent the only embodiments in which the present disclosure may be practiced.

Cube mapping is one of the methods to obtain more realistic images. Specifically, the cube mapping refers to a technique of applying a cube map which is a 2D image on a surface of a 3D object in order to map a texture or the like to the surface of the 3D object. The cube map is a composition of an environment seen from a viewpoint of a 3D object in the form of a map of six faces of a cube, and can be obtained using a panoramic image. The cube mapping is preferred over other reflection mapping techniques due to much higher computational efficiency, although the quality may be somewhat reduced.

FIG. 1 is a configuration diagram of an image-based lighting apparatus according to one embodiment of the present disclosure.

Referring to FIG. 1, an image-based lighting apparatus 10 includes all or some of a camera 110, an image receiving unit 120, a lookup table 130, an image generation unit 140, an image correction unit 150, a post-processing unit 160, a cube mapping unit 170, and an output unit 180.

The camera 110 captures a scene of one of the front, rear, and side of a vehicle. The camera 110 may be one of a front camera, a rear camera, and a side camera mounted on the vehicle. The camera 110 may be a wide-angle camera, an ultra-wide-angle camera, or a fisheye camera. However, the type and installation location are not limited thereto, and can be variously modified and designed by a person skilled in the art within the technical scope of the present disclosure.

The image receiving unit 120 receives an input image obtained by capturing the scene of one of the front, rear, and side of the vehicle from the camera 110.

The lookup table 130 stores a relationship in which a first coordinate of each pixel constituting a region of interest of the received input image corresponds to a second coordinate of a pixel of a panoramic image. This is to reduce an amount of real-time computation for generating the panoramic image and to obtain a more sophisticated and realistic panoramic image.

The lookup table 130 may be generated by corresponding each of the pixels constituting the panoramic image to the pixels of the input image through backward mapping. Since forward mapping causes a hole or overlap, backward mapping is performed. The lookup table 130 may be generated and provided in advance or newly generated when the type and/or installation location of the camera 110 is changed.

The backward mapping is to find a correspondence by performing an inverse operation on a process of generating the panoramic image from the input image in reverse order. Therefore, in order to explain the process of generating a lookup table, the process of generating the panoramic image from the input image will be explained first, and then the process of performing backward mapping will be explained.

The process of generating the panoramic image from the input image includes a step of obtaining a first image by cropping the region of interest in the input image and obtaining an intermediate image by connecting the first image and a second image obtained by flipping the first image horizontally, and a step of distorting the intermediate image. The process of generating the panoramic image may further include a step of asymmetrically converting the distorted intermediate image.

The step of obtaining the cropped first image by setting the region of interest (ROI) is to remove parts of a camera included in the input image. Here, the region of interest may be a region previously set according to the type, the installation location, or the like of the camera, but may be variously set within the technical scope of the present disclosure.

According to one embodiment, a step of resizing the first image may be further included. Since the camera used in a 3-Dimensional Surround View Monitor (3D SVM) is usually facing downward, the ratio of the bottom in the input image is high, and thus, the step of resizing may be provided to appropriately set the ratio of the image contents reflected on the 3D vehicle model. For example, only the upper region of the input image, not the bottom, can be enlarged in a vertical direction. For example, only the upper region of the input image can be vertically stretched according to a preset magnification ratio. Here, the magnification ratio may be set in advance according to the installation position and angle of the camera.

Although the panoramic image is a 2D image, when projected on a 3D closed space (for example, a sphere or a cube), the image must be seamless in either direction. To this end, two conditions must be satisfied: 1) continuous when the left edge and right edge of the image are connected, and 2) continuous when the top and bottom of the image are rolled and connected.

To meet the first condition, the intermediate image is obtained by connecting the first image and the second image obtained by flipping the first image horizontally. The reason for doing this is that the input image and the first image almost do not satisfy the first condition or are not bilaterally symmetrical images. For example, when images that do not meet the first condition are simply copied and connected, discontinuous images are obtained in the connected region, so left-right inverted images are connected.

Image processing to meet the second condition is performed using an image correction unit 150 to be described later.

Meanwhile, in the intermediate image, a portion where the first image and the second image are connected may be unnatural. Therefore, in order to obtain a high-quality panoramic image, the step of distorting the intermediate image is performed to have the characteristics of a 360° or omnidirectional panoramic image. For example, the step of distorting the intermediate image may be performed to have characteristics of an equirectangular panoramic image. Specifically, like lens distortion, it is possible to distort the intermediate image so that it spreads out based on the center point, reduce the distortion in the central part of the distorted intermediate image again, and readjust the position of the vanishing point.

A step of asymmetrically converting the panoramic image generated by distorting the intermediate image may be further included. This is because when a symmetrical image is used, reflections are symmetrically formed in the 3D vehicle model, resulting in unnatural output. For example, the panoramic image may be converted into an asymmetrical image by moving the panoramic image in one direction, either left or right, pixel by pixel by a predetermined movement ratio. In addition, the left or right direction may be determined in response to a viewpoint of the vehicle or a shift mode of the transmission.

In order to generate the lookup table 130, the sample panoramic image generated through the above-described steps may be used. That is, the first coordinate of the pixel of the input image corresponding to each of the pixels of the sample panoramic image may be obtained by performing an inverse operation on the above-described steps on each of the pixels of the sample panoramic image in reverse order.

Figure 3:
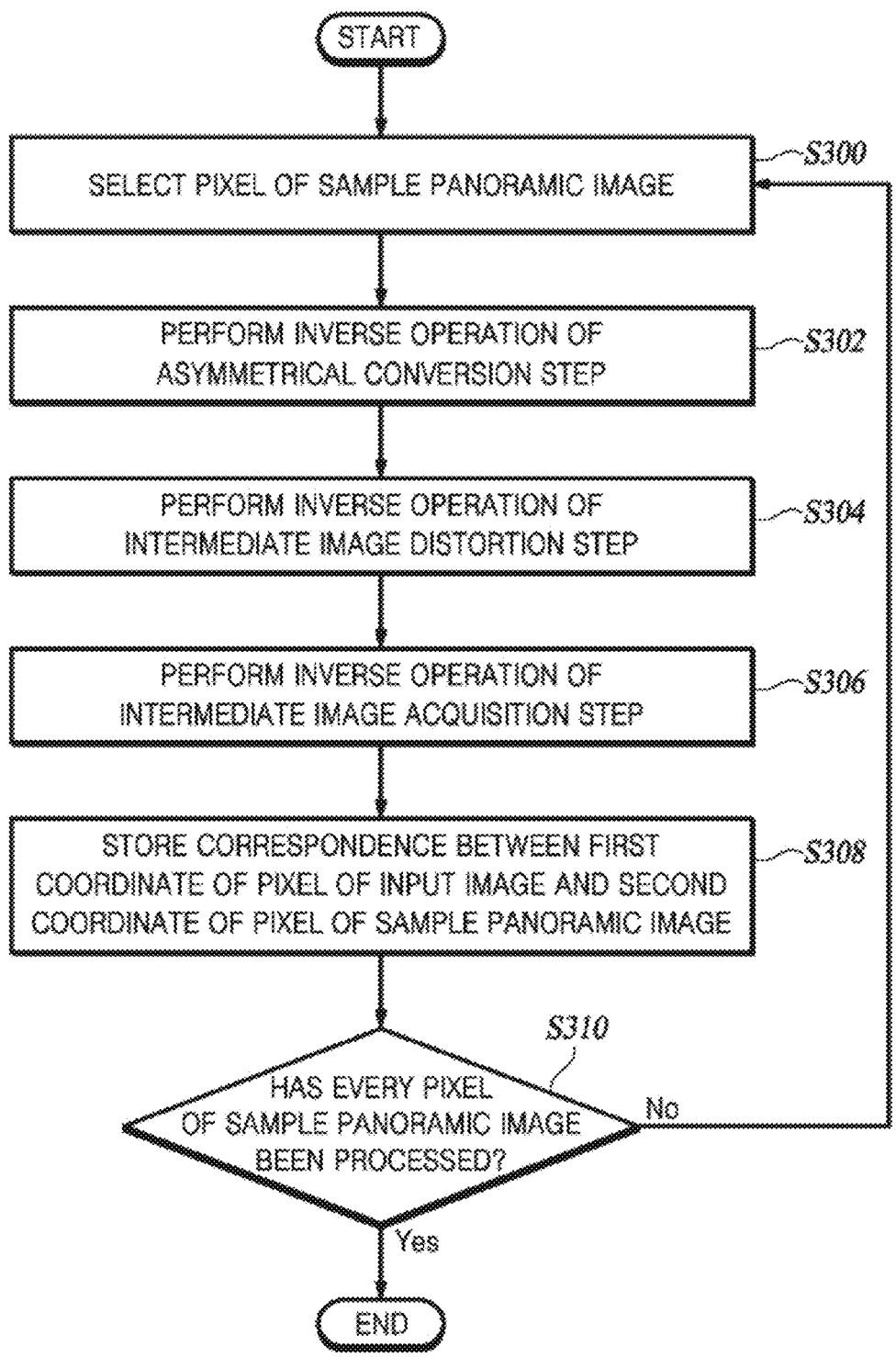
FIG. 3 illustrates a process of generating a lookup table according to one embodiment of the present disclosure.

The process of generating the lookup table according to one embodiment of the present disclosure is illustrated in FIG. 3.

Referring to FIG. 3, one of the pixels constituting the sample panoramic image is selected (S300). An inverse operation of the step of asymmetrically converting may be performed on the selected pixel (S302).

An inverse operation of the step of obtaining the panoramic image by distorting the intermediate image is performed (S304). By performing an inverse operation using Equation 1, the coordinates ($x_{dist}$, $y_{dist}$) of the intermediate image corresponding to the coordinates (x', y') of the pixel of the panoramic image can be obtained.

$$x_{dist} = d_h \cdot c \cdot (x' - (w \cdot 0.5)) \cdot (w \cdot 0.5)$$

$$y_{dist} = d_v \cdot (y' - (h \cdot 0.5)) \cdot (h \cdot 0.5) \quad \text{[Equation 1]}$$

Here, $x_{dist}$ and $y_{dist}$ are a horizontal coordinate value and a vertical coordinate value of the intermediate image, respectively. The values x' and y' are a horizontal coordinate value and a vertical coordinate value of the sample panoramic image, respectively. The value w is a horizontal length of the sample panoramic image, and h is a vertical length of the sample panoramic image. The values $d_h$ and $d_v$ are a horizontal distortion value and a vertical distortion value, respectively, and c is a vanishing point adjustment value.

The values $d_h$, $d_v$, and c that distort the intermediate image can be obtained using Equation 2.

$$d_h = \sin(a_h)^{k_d} \quad d_v = \sin(a_v)^{k_d} \quad k_d > 1.0 \quad \text{[Equation 2]}$$

$$c = k_{adj} \cdot \cos(r \cdot 90)^{2.5} + 1.0$$

$$a_h = a_{total} \cdot \left(\frac{r \cdot a_{total}}{a_{total}}\right)^{k_h} \quad a_v = a_{total} \cdot \left(\frac{r \cdot a_{total}}{a_{total}}\right)^{k_v} \quad k_h > 1.0, k_v > 1.0$$

$$r = \frac{l}{\sqrt{(w \cdot 0.5)^2 + (h \cdot 0.5)^2}}$$

$$l = \sqrt{(x' - (w \cdot 0.5))^2 + (y' - (h \cdot 0.5) \cdot b)^2}$$

Here, $a_h$ and $a_v$ are used as inputs for $d_h$ and $d_v$ and usually have values from 0 to 110±10. The value $k_d$ determines how convexly distorted it is, and a number greater than 1 is, therefore, used. The values $a_h$ and $a_v$ are obtained by converting r to angles, and gamma correction is applied to apply them naturally. The values $k_h$ and $k_v$ are horizontal and vertical gamma correction coefficients, respectively, and are used differently. In order to reduce distortion in the center, b can be adjusted; b has a value less than 1. In order to move the vanishing point, $k_{adj}$ can be adjusted to make the vanishing points converge or spread out in the center. The value c is applied only in the horizontal direction.

The inverse operation of the step of obtaining an intermediate image from the input image is performed (S306). By performing the inverse operation using Equation 3, the coordinates (x, y) of the input image corresponding to the coordinates ($x_{dist}$, $y_{dist}$) of the pixel of the intermediate image can be obtained.

$$\begin{cases} x = x_1 + x_{dist} \cdot \left(\frac{(x_2 - x_1) \cdot 2}{w}\right), y = y_1 + y_{dist} \cdot \left(\frac{(y_3 - y_1)}{h}\right), \\ \qquad \text{if } w \cdot 0.5 > x' \\ x = x_1 + ((x_2 - x_1) - (x_{dist} - (w \cdot 0.5))) \cdot \left(\frac{(x_2 - x_1) \cdot 2}{w}\right), \\ \qquad y = y_1 + y_{dist} \cdot \left(\frac{(y_3 - y_1)}{h}\right), \text{otherwise} \end{cases} \quad \text{[Equation 3]}$$

Here, $x_{dist}$ and $y_{dist}$ are a horizontal coordinate value and a vertical coordinate value of the intermediate image, respectively. The values x and y are a horizontal coordinate value and a vertical coordinate value of the input image, respectively. The values $x_1$ and $y_1$ are a horizontal coordinate value and a vertical coordinate value of an upper left corner of the region of interest of the input image, respectively, $x_2$ and $y_2$ are a horizontal coordinate value and a vertical coordinate value of an upper right corner of the region of interest of the input image, respectively, $x_3$ and $y_3$ are a horizontal coordinate value and a vertical coordinate value of a lower left corner of the region of interest of the input image, respectively, and $x_4$ and $y_4$ are a horizontal coordinate value and a vertical coordinate value of a lower right corner of the region of interest of the input image, respectively. The value w is a horizontal length of the intermediate image and has the same value as the horizontal length of the sample panoramic image. The value h is a vertical length of the intermediate image and has the same value as the vertical length of the sample panoramic image. In the coordinate system of the input image, the left upper corner is an origin (0, 0), the value of x increases in the right direction, and the value of y increases in the downward direction.

A correspondence between the first coordinates of the pixels of the input image obtained by performing Steps S302 to S306 and the second coordinates of the pixels of the sample panoramic image selected in Step S300 is stored (S308). When Steps S300 to S308 are performed on all pixels of the sample panoramic image (S310), the process of generating a lookup table is completed.

Referring to Equations 1 to 3, the coordinates (x', y') of the pixels of the panoramic image corresponding to the coordinates (x, y) of each of the pixels constituting the region of interest of the input image may be one or more.

Meanwhile, Equations 1 to 3 are according to one embodiment of the present disclosure and are not necessarily limited thereto, and other equations may be applied within the technical scope of the present disclosure.

Referring back to FIG. 1, the image generation unit 140 maps the first coordinates of each of the pixels constituting the region of interest of the received input image to the corresponding second coordinates using the lookup table 130 to generate the panoramic image. By reducing the amount of computation using a lookup table, more sophisticated and realistic panoramic images can be generated in real time.

The image correction unit 150 performs alpha blending on the upper region and/or lower region of the panoramic image generated by the image generation unit 140 using a single color and naturally performs filling to meet the second condition described above. That is, the upper region and/or the lower region can be continuously connected by performing the alpha blending using a single color.

The image correction unit 150 determines at least one partial area to be processed for alpha blending in the panoramic image. For example, the upper region and/or the lower region corresponding to a predetermined ratio of the vertical length of the panoramic image may be determined as regions to be processed for alpha blending. Here, the predetermined ratio may be a value set to 20%, but may be changed to another value. For another example, when the cube map is converted, a region corresponding to all or some of the upper and lower surfaces may be determined as a region to be processed for alpha blending.

The image correction unit 150 analyzes histograms of red (R), green (G), and blue (B) of the region to be processed for alpha blending, and extracts a red value, a green value, and a blue value with the highest frequency. Thereafter, a color in which these colors are combined is selected. For example, when the upper region is determined as a region to be processed for alpha blending, each of the red histogram, the green histogram, and the blue histogram of the upper region is obtained. Thereafter, most frequently used red value, green value, and blue value can be extracted from each histogram respectively, and a color obtained by combining these values can be selected.

The image correction unit 150 applies the alpha blending to the region to be processed for alpha blending using the selected color. For example, alpha blending may be processed using Equation 4, but is not limited thereto, and other blending methods may be applied within the technical scope of the present disclosure for naturally performing the filling of colors while satisfying the second condition.

$$f_{Rout}(j, i) = f_R(j, i) \cdot \frac{i}{k} + C_R \cdot \left(1 - \frac{i}{k}\right)$$ [Equation 4]

$$f_{Gout}(j, i) = f_G(j, i) \cdot \frac{i}{k} + C_G \cdot \left(1 - \frac{i}{k}\right)$$

$$f_{Bout}(j, i) = f_B(j, i) \cdot \frac{i}{k} + C_B \cdot \left(1 - \frac{i}{k}\right)$$

Here, k is a vertical coordinate value of a last line of the region to be processed for alpha blending, i is a vertical coordinate value of a current input pixel, j is a horizontal coordinate value of the current input pixel, $C_R$ is a value with the highest frequency in the red histogram of the region to be processed for alpha blending, $C_G$ is a value with the highest frequency in the green histogram of the region to be processed for alpha blending, $C_B$ is a value with the highest frequency in the blue histogram of the region to be processed for alpha blending, $f_R$ is a red value of the current input pixel, $f_G$ is a green value of the current input pixel, $f_B$ is a blue value of the current input pixel, $f_{ROUT}$ is an alpha blended red value of the current input pixel, $f_{GOUT}$ is an alpha blended green value of the current input pixel, and $f_{BOUT}$ is an alpha blended blue value of the current input pixel.

The post-processing unit 160 may perform adjustment to lower the saturation of the panoramic image. The reason for lowering the saturation is that when the saturation of the panoramic image to be reflected is high, the color of the 3D vehicle model may be distorted. Moreover, in order to prevent a great sense of difference between the alpha blended region and other regions, the saturation is lowered. However, in order to reduce the amount of computation, the step of lowering saturation may be omitted when the deviation of the red, green, and blue values of the color used for alpha blending is not large. For example, when 0.95<(red value/green value)<1.05 and 0.95<(red value/blue value) <1.05, the step of lowering saturation may be omitted.

The cube mapping unit 170 converts the finally generated panoramic image into a cube map image and applies the cube map image to the 3D vehicle model.

The output unit 180 outputs the 3D vehicle model to which the cube map image is applied to a 3D SVM 190. The 3D SVM 190 provides a highly realistic 3D surround view in which a real image around the vehicle is reflected on the surface of the 3D vehicle model.

Figure 2:
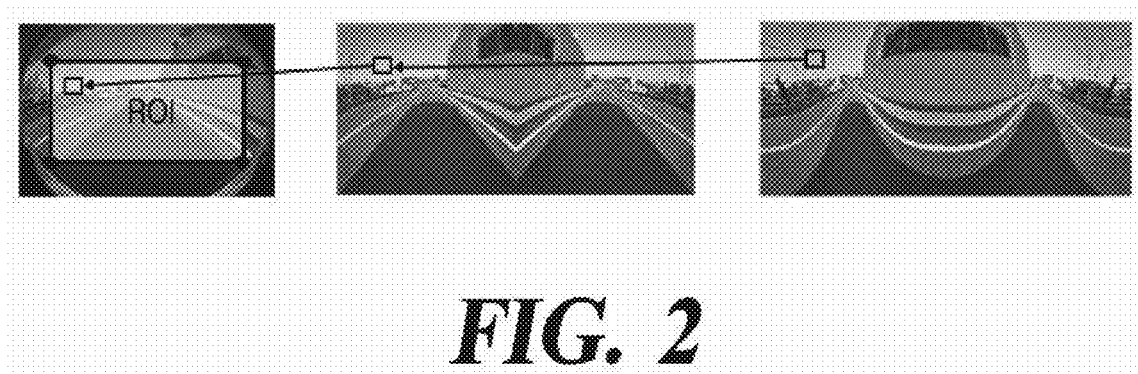
FIG. 2 is an exemplary diagram for illustrating backward mapping between an input image and a panoramic image according to one embodiment of the present disclosure.

FIG. 2 is an exemplary diagram for illustrating backward mapping between the input image and the panoramic image according to one embodiment of the present disclosure.

Referring to FIG. 2, the panoramic image, the intermediate image and the input image are illustrated from left to right. Using Equation 1 and Equation 2, the coordinates ($x_{dist}$, $y_{dist}$) of the intermediate image corresponding to the coordinates (x', y') of the pixel of the panoramic image may be obtained, and using Equation 3, the coordinates (x, y) of the input image corresponding to the coordinates ($x_{dist}$, $y_{dist}$) of the intermediate image may be obtained, and thus, finally, the coordinate (x, y) of the input image corresponding to the coordinates (x', y') of the pixel of the panoramic image may be obtained.

Figure 4:
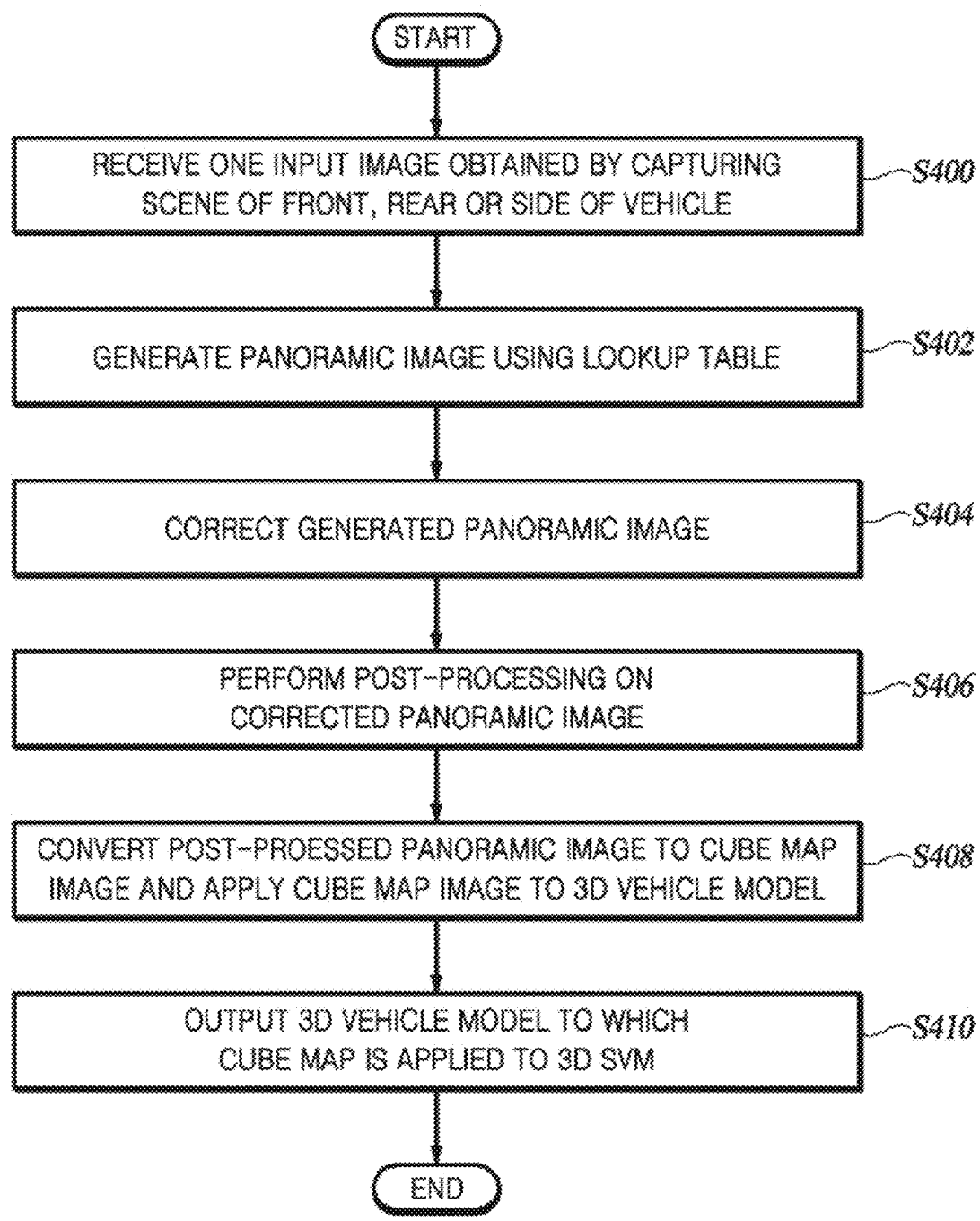
FIG. 4 is a flowchart of an image-based lighting method according to one embodiment of the present disclosure.

FIG. 4 is a flowchart of an image-based lighting method according to one embodiment of the present disclosure.

Referring to FIG. 4, the image receiving unit 120 receives one input image obtained by capturing scenes of the front, rear, or side of the vehicle from the camera 110 (S400).

The image generation unit 140 generates the panoramic image using the lookup table 130 (S402).

The image correction unit 150 applies the alpha blending on the generated panoramic image to perform correction (S404).

The post-processing unit 160 adjusts the saturation of the corrected panoramic image based on the deviations of the red, green and blue values of the colors used for alpha blending (S406).

The cube mapping unit 170 converts the post-processed panoramic image into the cube map image and applies the cube map image to the 3D vehicle model (S408).

The output unit 180 outputs the 3D vehicle model to which the cube map image is applied to the 3D SVM 190 (S410).

Each component of the device or method according to the present disclosure may be implemented as hardware or software, or a combination of hardware and software. In addition, the function of each component may be implemented as software, and the microprocessor may be implemented to execute the software function corresponding to each component.

Various implementations of the systems and techniques described herein may be implemented by a digital electronic circuit, an integrated circuit, a field programmable gate array (FPGA), an application specific integrated circuit (ASIC), a computer hardware, a firmware, software, and/or a combination thereof. These various implementations may include being implemented as one or more computer programs executable on a programmable system. The programmable system includes at least one programmable processor (which may be a special purpose processor or may be a general-purpose processor) coupled to receive data and instructions from and transmit data and instructions to a storage system, at least one input device, and at least one output device. Computer programs (also known as programs, software, software applications or code) contain instructions for a programmable processor and are stored on a computer readable recording medium.

The computer-readable recording medium includes all types of recording devices in which data that can be read by a computer system is stored. These computer-readable recording media may be non-volatile or non-transitory media such as a ROM, a CD-ROM, a magnetic tape, a floppy disk, a memory card, a hard disk, a magneto-optical disk, and a storage device, and may further include a transitory medium such as a data transmission medium. In addition, the computer-readable recording media may be distributed in computer systems connected through a network, and computer-readable codes may be stored and executed in a distributed manner.

In the flowcharts of the present specification, it is described that each process is sequentially executed, but this is merely an example of the technical idea of one embodiment of the present disclosure. In other words, those skilled in the art to which one embodiment of the present disclosure belongs can change and execute the order described in the flowchart/timing diagram within the range that does not deviate from the essential characteristics of the embodiment of the present disclosure, or can execute one or more process in parallel to apply various modifications and variations, and thus, the flowchart/timing chart is not limited to a time-series sequence.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the embodiments of the present disclosure is not limited by the illustrations. Accordingly, one of ordinary skill would understand that the scope of the claimed invention is not to be limited by the above explicitly described embodiments but by the claims and equivalents thereof.

What is claimed is:

1. An image-based lighting method comprising:
receiving an input image obtained by capturing a scene of one of a front, rear and side of a vehicle;
generating a panoramic image by mapping a first coordinate of each pixel constituting a region of interest of the received input image to a corresponding second coordinate using a lookup table;
analyzing histograms of red, green, and blue of an upper region of the panoramic image to select a color in which a red value, a green value, and a blue value with a highest frequency are combined, and performing alpha blending on the upper region using the selected color;
adjusting saturation of the panoramic image based on a deviation between the red value, the green value, and the blue value having a highest frequency;
converting the panoramic image into a cube map image; and
applying the cube map image to a 3D vehicle model,
wherein the lookup table stores a relationship in which a first coordinate of each pixel constituting the region of interest of the input image corresponds to a second coordinate of a pixel of the panoramic image.

2. The image-based lighting method of claim 1, wherein the lookup table is generated by backward mapping each pixel constituting a sample panoramic image to a corresponding pixel of the input image; and
wherein the sample panoramic image is generated by obtaining a first image by cropping the region of interest in the input image; obtaining an intermediate image by connecting the first image and a second image obtained by horizontally flipping the first image; and distorting the intermediate image.

3. The image-based lighting method of claim 1, wherein the lookup table is generated by backward mapping each pixel constituting a sample panoramic image to a corresponding pixel of the input image; and
wherein the sample panoramic image is generated by obtaining a first image by cropping the region of interest in the input image; obtaining an intermediate image by connecting the first image and a second image obtained by horizontally flipping the first image; distorting the intermediate image; and moving the distorted intermediate image in a left or right direction by a predetermined movement ratio.

4. The image-based lighting method of claim 1, wherein the lookup table includes at least one pixel of the panoramic image corresponding to each of the pixels constituting the region of interest of the input image.

5. The image-based lighting method of claim 1, further comprising outputting the 3D vehicle model to which the cube map image is applied to a three-Dimensional Surround View Monitor (3D SVM).

6. An image-based lighting apparatus comprising:
a camera disposed to capture a scene of one of a front, rear and side of a vehicle;
an image receiving unit configured to receive an input image captured by the camera;
a lookup table configured to store a relationship in which a first coordinate of each pixel constituting a region of interest of the input image corresponds to a second coordinate of a pixel of a panoramic image;
an image generation unit configured to generate the panoramic image by mapping the first coordinate of each pixel constituting the region of interest of the received input image to the corresponding second coordinate using the lookup table;

an image correction unit to configured to analyze histograms of red, green, and blue of an upper region of the panoramic image to select a color in which a red value, a green value, and a blue value with a highest frequency are combined, and perform alpha blending on the upper region using the selected color;

a post-processing unit configured to adjust saturation of the panoramic image based on a deviation between the red value, the green value, and the blue value having the highest frequency; and a cube mapping unit configured to convert the panoramic image into a cube map image and apply the cube map image to a 3D vehicle model.

7. The image-based lighting apparatus of claim 6, wherein:

the lookup table is generated by backward mapping each pixel constituting a sample panoramic image to a corresponding pixel of the input image; and the sample panoramic image is generated by cropping the region of interest in the input image to obtain a first image, obtaining an intermediate image by connecting the first image and a second image obtained by horizontally flipping the first image, and distorting the intermediate image.

8. The image-based lighting apparatus of claim 6, wherein:

the lookup table is generated by backward mapping each pixel constituting a sample panoramic image to a corresponding pixel of the input image; and the sample panoramic image is generated by cropping the region of interest in the input image to obtain a first image, obtaining an intermediate image by connecting the first image and a second image obtained by horizontally flipping the first image, distorting the intermediate image, and moving the distorted intermediate image in a left or right direction by a predetermined movement ratio.

9. The image-based lighting apparatus of claim 6, wherein the lookup table includes at least one pixel of the panoramic image corresponding to each of the pixels constituting the region of interest of the input image.

10. The image-based lighting apparatus of claim 6, further comprising an output unit configured to output the 3D vehicle model to which the cube map image is applied to a three-Dimensional Surround View Monitor (3D SVM).

* * * * *